United States Patent
Kuhn et al.

(10) Patent No.: US 10,731,540 B2
(45) Date of Patent: Aug. 4, 2020

(54) PISTON COOLING JETS

(71) Applicant: Illinois Tool Works Inc., Glenview, IL (US)

(72) Inventors: Joseph C. Kuhn, Des Plaines, IL (US); Jesus M. Leon, Evanston, IL (US); Dennis M. Mark, Buffalo Grove, IL (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 16/185,490

(22) Filed: Nov. 9, 2018

(65) Prior Publication Data

US 2019/0145301 A1 May 16, 2019

Related U.S. Application Data

(60) Provisional application No. 62/586,371, filed on Nov. 15, 2017.

(51) Int. Cl.

| | |
|---|---|
| *F01P 3/08* | (2006.01) |
| *F01P 5/10* | (2006.01) |
| *F01P 3/02* | (2006.01) |
| *F01M 1/08* | (2006.01) |
| *F01M 1/16* | (2006.01) |
| *F16N 7/34* | (2006.01) |

(52) U.S. Cl.
CPC ............. *F01P 3/08* (2013.01); *F01M 1/08* (2013.01); *F01M 1/16* (2013.01); *F01P 3/02* (2013.01); *F01P 5/10* (2013.01); *F01M 2001/083* (2013.01); *F01M 2001/086* (2013.01); *F01P 2003/021* (2013.01); *F16N 7/34* (2013.01)

(58) Field of Classification Search
CPC ........ F01P 3/08; F01P 5/10; F01P 3/02; F01P 2003/021; F16N 7/34; F01M 2001/083; F01M 2001/086; F01M 1/08; F01M 1/16
See application file for complete search history.

(56) References Cited

U.S. PATENT DOCUMENTS

| | | | | |
|---|---|---|---|---|
| 5,533,472 | A | * | 7/1996 | Sands ................. F01P 3/08 123/41.35 |
| 6,267,147 | B1 | * | 7/2001 | Rago ................. F01D 25/20 138/26 |
| 6,955,142 | B2 | | 10/2005 | Patel et al. |
| 7,171,813 | B2 | * | 2/2007 | Tanaka ................. F23R 3/14 431/174 |
| 9,334,766 | B2 | | 5/2016 | Mordukhovich |
| 9,556,764 | B2 | | 1/2017 | Claywell et al. |
| 9,605,620 | B2 | | 3/2017 | Leone |
| 2005/0183677 | A1 | * | 8/2005 | Patel ................. F01M 1/08 123/41.35 |
| 2015/0330286 | A1 | * | 11/2015 | Claywell ................. F01M 1/08 123/41.35 |
| 2016/0290188 | A1 | * | 10/2016 | Gokan ................. F01M 1/08 |

* cited by examiner

*Primary Examiner* — Jacob M Amick
*Assistant Examiner* — Charles Brauch
(74) *Attorney, Agent, or Firm* — Quarles & Brady LLP

(57) ABSTRACT

An oil spray system for use in an engine for spraying directly onto a piston or cylinder wall, includes a supply line having at least one nozzle mounted to the supply line and at least one outlet on the nozzle. The system can include a control device. The control device can be mounted to the supply line. The nozzle and/or outlet is configurable to provide a predetermined spray direction or pattern.

18 Claims, 10 Drawing Sheets

PISTON COOLING JETS

CROSS-REFERENCE TO RELATED APPLICATION DATA

This application claims the benefit of and priority to Provisional U.S. Patent Application Ser. No. 62/586,371, filed Nov. 15, 2017, titled "Piston Cooling Jets", the disclosure of which is incorporate herein in its entirety.

BACKGROUND

The present disclosure relates to a piston cooling jets, and more particularly to selectively tunable (e.g., spray direction and patterns) oil jets for cooling engine pistons.

There are continuing efforts to develop new and improved ways in which to cool engine pistons and cylinders. As engines become more efficient, run at higher compression ratios and cylinder pressures (e.g., turbocharging and supercharging) and emitting lower emissions, the engines, and in particular the pistons and cylinders run hotter, e.g., at higher temperatures. Increased thermal loading of pistons can, however, cause problems such as, engine degradation and seizures.

While it is desirable to effectively and efficiently cool and/or lubricate the pistons and cylinders, incorporating systems to avoid such degradation can involve higher-cost materials and manufacturing methods. One known system, a piston and cylinder oil squirter system, uses one or more squirter rails having an inlet connected to an oil source and one or more outlets connected to at least one oil supply rail. The oil supply rail includes a manifold with integral oil squirter nozzles and attachment brackets. An oil flow control valve placed before the oil supply manifold controls oil flow to the oil rails and nozzles in response to engine requirements. One drawback to such a system is that the oil is squirted (supplied) to the piston and cylinder on a constant basis, regardless of the position of the piston in the cylinder.

In another system an oil supply is repeatedly activated only during a part of a cylinder cycle synchronous with a frequency of piston reciprocating motion. In this way, oil supply may be provided during a portion of the engine cycle and not in a continuous manner. Such a system resolves the issue of a proportion of the oil supply being sprayed without cooling the piston due to the reciprocating motion of the piston. However, the system uses a series of poppet valves to control the flow of oil to each piston in which a piston skirt contacts the poppet valve to open the valve. While such a system functions to supply or spray oil at a desired location and time in the engine cycle, there is nevertheless contact between the piston skirt and poppet valve.

Still other systems show that a cooling and lubricating jet of oil can be supplied to individual piston/cylinder combinations using, for example, the position of the crankshaft to control the flowrate and timing of oil flow to the piston, and an oil flow controller than controls the flowrate of oil to the piston in response to engine temperature.

While all of the above-noted systems function to supply oil to the piston to effect piston cooling they all require fairly complex system to carry out timing and/or actuation of the oil spray to effect piston cooling.

Accordingly, there is a need for a system that is a drop-in rail or manifold system that includes a rail or manifold with a series of individual cooling jets or nozzles that can be directed at specific desired locations of the piston, for example at an area of the piston near the exhaust port or valve. Desirably, such a system includes a control device, such as a solenoid valve, check valve, thermostatic valve or the like to control the flow of oil to the cooling jets.

More desirably, in such a system, the manifold is not tied to any other critical galleries of the engine and can be shut off without isolating the oil supply to any other parts of the engine.

SUMMARY

An oil spray system for use in an engine includes a supply line and at least one nozzle mounted to the supply line. The at least one nozzle has at least one outlet, and, if more than one outlet or nozzle is present, the nozzles or outlets may spray oil in converging or diverging directions or patterns. The oil spray can be directed onto a piston or cylinder wall. One example spray pattern is a fan-spray pattern which can be provided by a slot-shaped outlet. In embodiments, the system includes a control device mounted to the supply line that controls the flow of oil to the at least one nozzle. In an embodiment, the supply line is a manifold having at least two nozzles mounted thereto. Each nozzle includes at least one outlet. For purposes of the present disclosure, the terms nozzle or nozzles and jet or jets may be used interchangeably.

The control device can be positioned between an oil supply and a first of the nozzles. The nozzles can be elements separate from the supply line or attached to the supply line. A connecting portion between the supply line and each nozzle extends outwardly from the supply line. This permits positioning of the nozzles to direct the oil flow to specific areas of the engine, such as the pistons, for example at an area of the piston near the exhaust port or valve.

In an embodiment, each nozzle includes one or more outlets and, when more than one outlet is present, the outlets are formed in the nozzle at different distances from a juncture of the nozzle and the supply line.

The control device can be, for example, a solenoid valve, a thermostatic valve or a check valve.

An embodiment of the oil spray system includes a supply line, a plurality of nozzles mounted to the supply line, each nozzle having at least one outlet and a control device mounted to the supply line, the control device controlling a supply of oil to the supply line. The nozzles and/or outlets are configurable to provide a predetermined spray direction or pattern.

The supply line can be a manifold and the control device can be positioned at an end of the manifold. The nozzles can be formed as a continuous flow channel. In an embodiment, the continuous flow channel is circular and extends around a base of the cylinder.

In an embodiment, the oil spray system includes an accumulator. The accumulator can be positioned on the supply line, between the control device and a first nozzle. The accumulator allows for oil flow and piston cooling on-demand regardless of the oil output of the oil pump or oil flow within the engine, engine speed or the like. The accumulator also dampens the supply of oil and delivery of oil to the piston and dampens pulsations in the manifold The nozzles can be formed having a tapered channel. The taper provides a reduced flow area from a first outlet to a second outlet and can be used to balance the oil flow to selected locations of the piston. The taper can be a step-wise taper or reduction in flow area.

These and other features and advantages of the present device will be apparent from the following description, taken in conjunction with the accompanying sheets of drawings, and in conjunction with the appended claims.

BRIEF DESCRIPTION OF THE DRAWINGS

The benefits and advantages of the present embodiments will become more readily apparent to those of ordinary skill in the relevant art after reviewing the following detailed description and accompanying drawings, wherein:

FIGS. 2A-2E are various views of embodiments of an oil spray system showing a rail and manifold system, in which FIGS. 2A-2C illustrate an embodiment having a solenoid controller, FIG. 2D illustrates an embodiment without a controller, and FIG. 2E illustrates a nozzle or jet with multiple outlets;

FIGS. 10A-10C are various views showing a mounting arrangement for an oil spray within an engine, in which FIG. 10A is a bottom view of an engine showing a windage tray in place, and FIGS. 10B and 10C are view of a windage tray.

DETAILED DESCRIPTION

Figure 1:
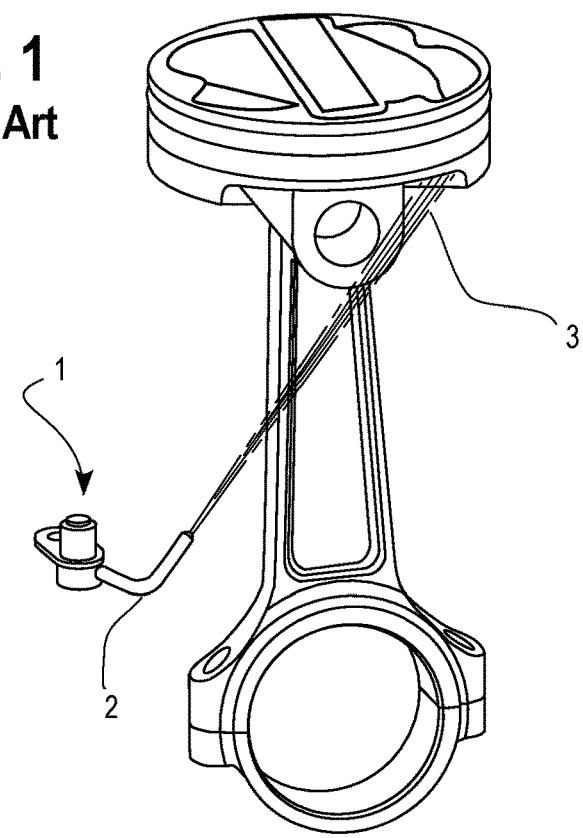
FIG. 1 is a rendering of a prior art piston oil spray.

While the present disclosure is susceptible of embodiment in various forms, there is shown in the drawings and will hereinafter be described one or more embodiments with the understanding that the present disclosure is to be considered illustrative only and is not intended to limit the disclosure to any specific embodiment described or illustrated.

FIG. 1 illustrates a known oil spray system 1 for an engine. It will be appreciated that the oil spray system 1 includes a nozzle 2 from which a single stream of oil 3 is discharged or sprayed onto a single location within an engine. Although simplified, the oil spray is a constant spray of oil regardless of the operating conditions of the engine. In embodiments in which a check valve is used (as discussed further below), the spray of oil is delivered when the engine oil pressure exceeds the threshold of the check valve.

Figure 2A:
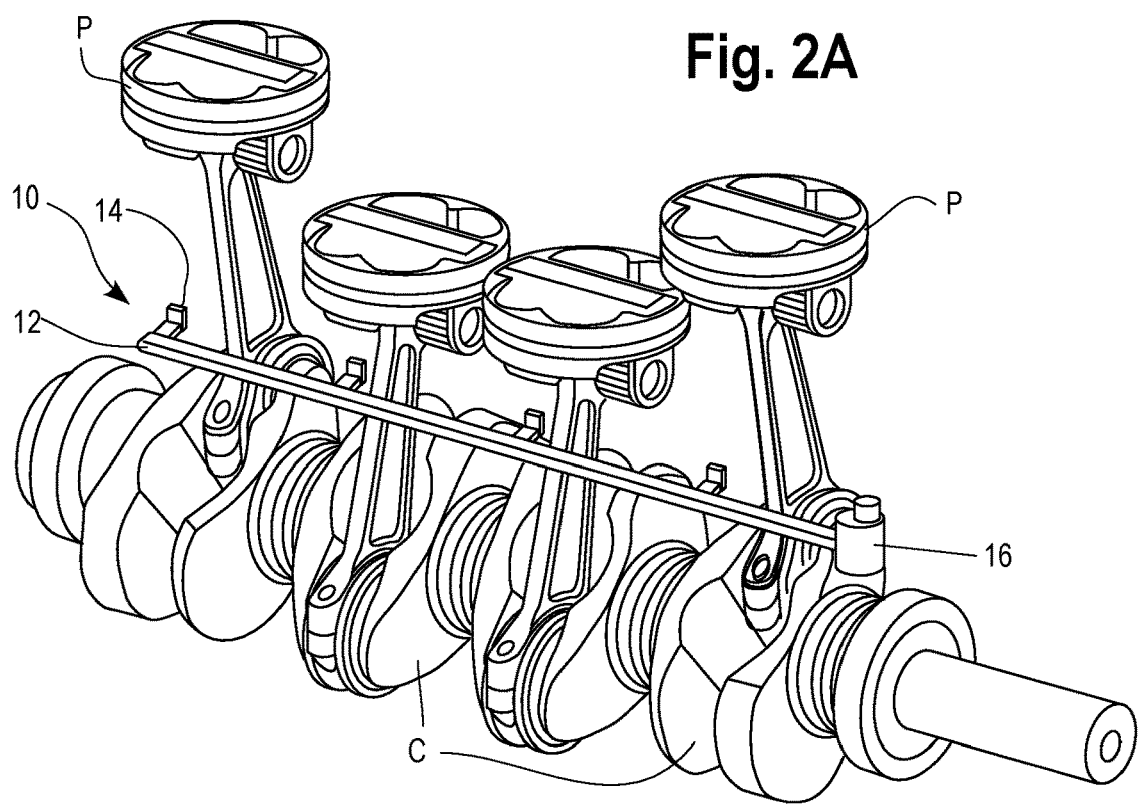
Figure 2B:
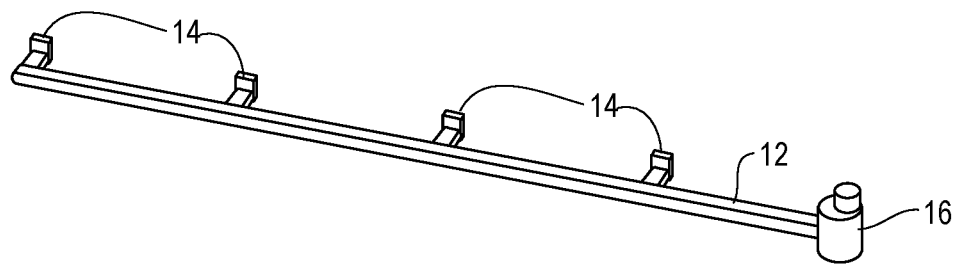
Figure 2C:
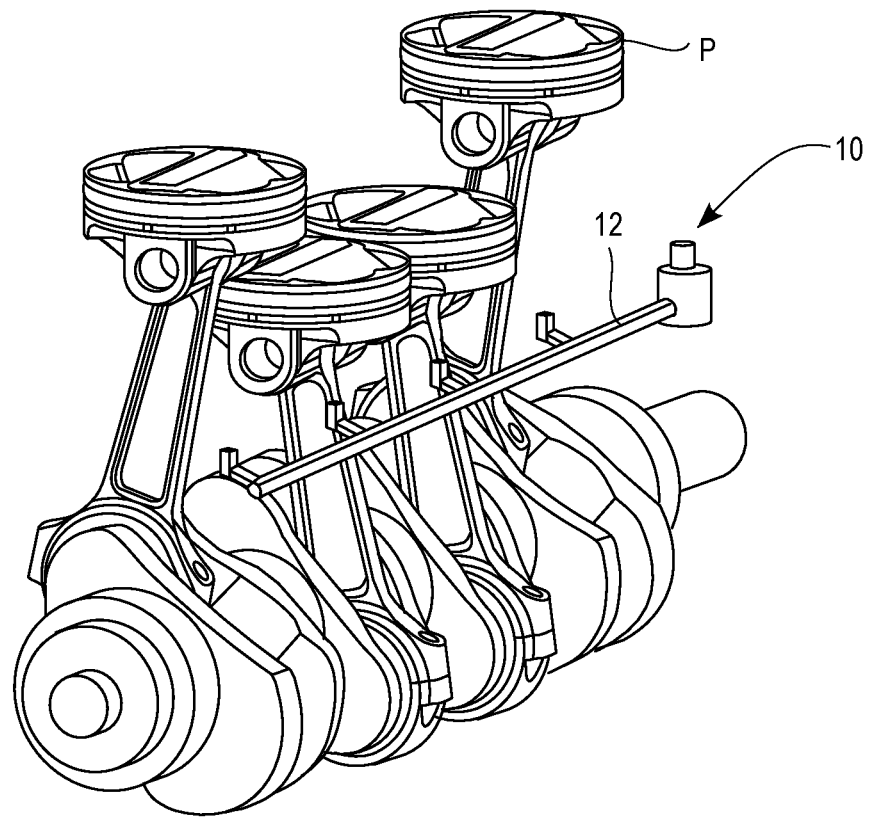

Referring now to FIGS. 2A-2C and 2E, there is illustrated one embodiment of an oil spray system or piston cooling jet system 10. The system 10 is a rail or manifold system and includes a rail or manifold 12 with one or a series of individual cooling jets 14 directed at specific desired locations of the piston P. The system 10 can be controlled by a solenoid valve 16 as illustrated, or can be controlled by other means, such as a check valve, a thermostatic valve (thus operating by engine temperature), or the like. In FIG. 2A, the engine block is not shown; rather, the system is shown relative to the engine crankshaft C and pistons P. In an embodiment, the manifold 12 is not tied to any other critical galleries of the engine and can be shut off (as by isolating the solenoid valve), without isolating the oil supply to any other parts of the engine. The use of a separate manifold 12 reduces engine block casting machining, thus reducing the costs of using/manufacturing the system and the engine overall.

Figure 2D:
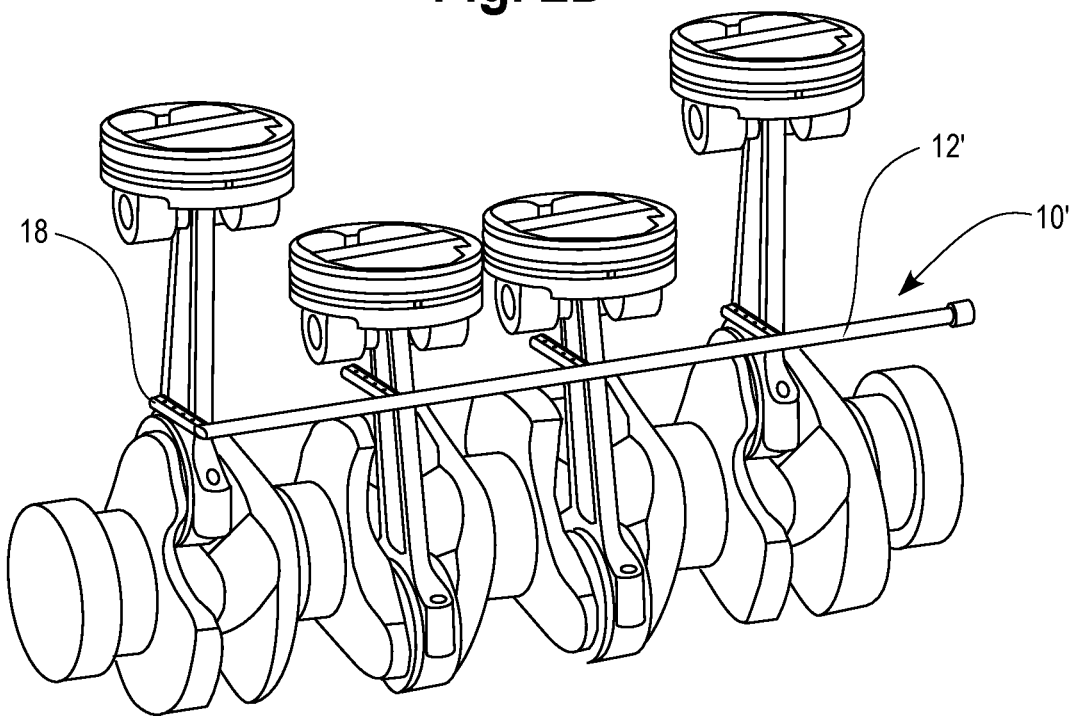
Figure 2E:
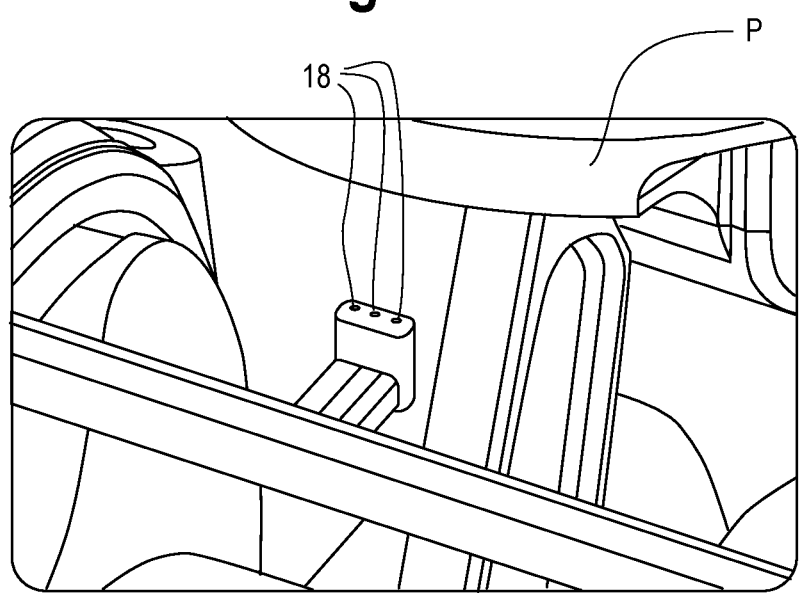

The jet(s) or nozzle(s) 14 can be separately attached to the manifold 12 to allow for outlet angle and target adjustment. Because the nozzles 14 can separate from the manifold 12, the nozzles 14 can have single or multiple outlets 18 which allow for targeting multiple and specific locations on the piston P, such as the area of the piston at or near the cylinder exhaust port/valve. The illustrated rail/manifold system 10 can be configured as a "drop-in" system which is capable of installation in existing engine programs without significant modification or redesign of the engine, due to the solenoid 16 and manifold 12 being an all-in-one, e.g., self-contained, system. Oil can be supplied to the rail/manifold 12 via the solenoid 16 through an existing engine block oil gallery or oil pump passage. FIG. 2D illustrates an embodiment of the system 10' in which the manifold 12' is fitted without a controller (without a control valve). In such an embodiment, the manifold 12' may connect, for example, directly to an oil pump, engine block oil gallery, or other source such that the inlet or inlets from the oil source provide the oil directly to the manifold 12'. Such a system, without a control valve (e.g., solenoid, check valve or the like) may be used with any of the manifold, nozzle/jet and outlet configurations disclosed herein.

Figure 3A:
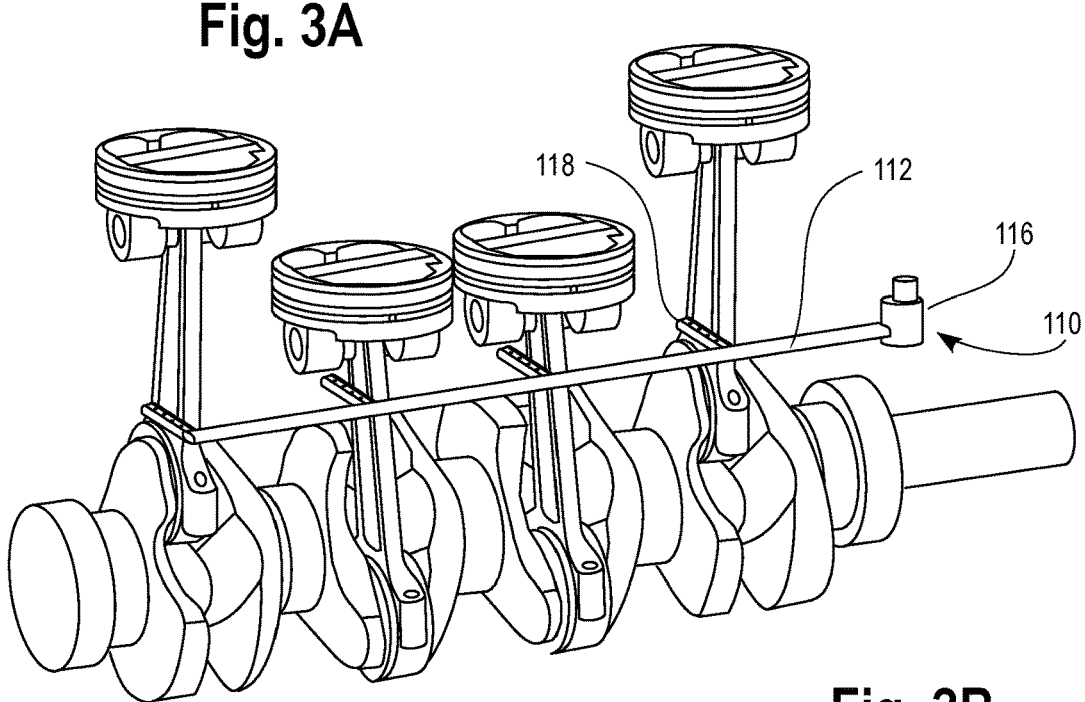
FIGS. 3A-3D are various views of an embodiment of an oil spray system showing a planar jet manifold system.
Figure 3B:
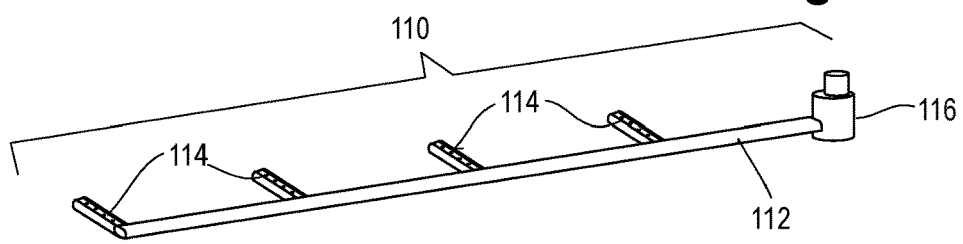
Figure 3C:
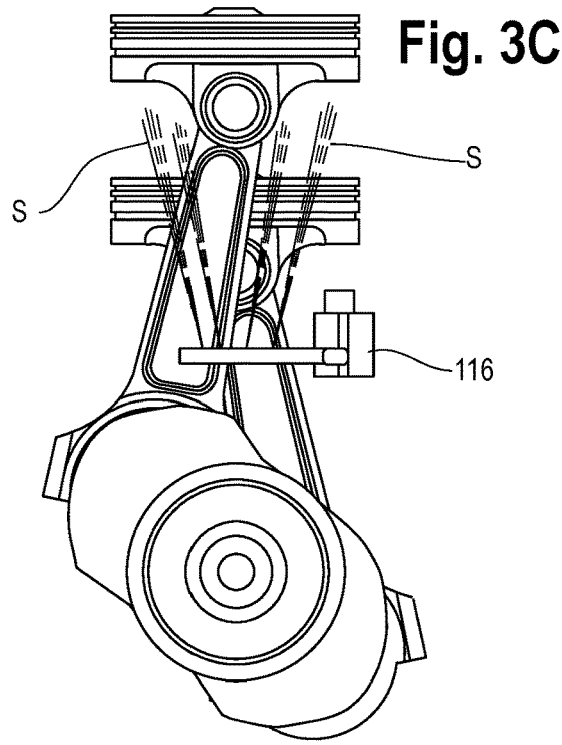
Figure 3D:
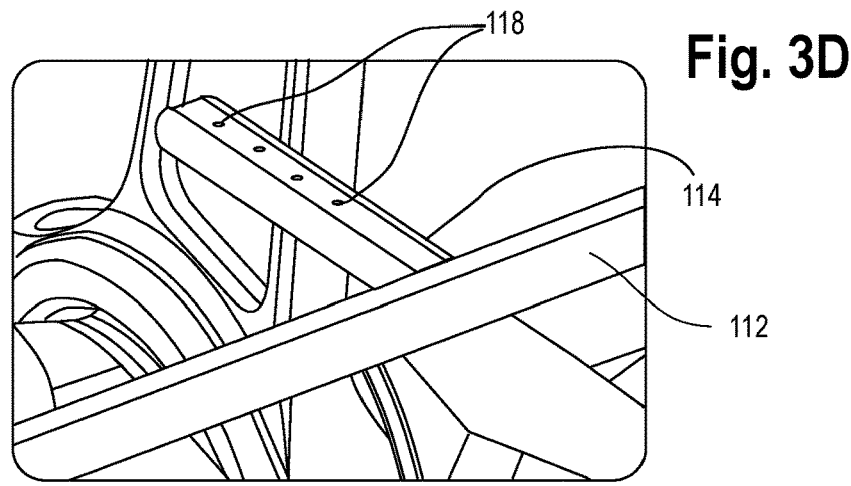

FIGS. 3A-3D illustrate an oil spray system 110 having a planar jet 114 configuration. The system 110 includes a manifold 112 and a series of planar jets 114 extending from the manifold 112. As with the prior embodiment, in this embodiment, the system 110 can be controlled by a solenoid valve 116 as illustrated, or it can be controlled by other means, such as a check valve, a thermostatic valve or the like. As seen in FIGS. 3C and 3D, each nozzle 114 can include multiple outlets 118 to direct the oil spray to specific desired areas of the piston, such as the areas of the piston at or near the cylinder exhaust port/valve and intake port/valve (see, for example, FIG. 3C which shows one desired angle/direction of the oil spray S).

In installation, the manifold 112 can be offset to one or both sides of the engine connecting rods to permit easy adaptation into existing engine designs.

Also as with the prior embodiment, the system 110 is a "drop-in" system so that it is capable of installation in existing engine programs without significant modification or redesign, as the solenoid 116 and manifold 112 are an all-in-one, e.g., self-contained, system. Again, oil can be supplied to the rail/manifold 112 via the solenoid 116 through an existing engine block oil gallery or oil pump passage.

Figure 4A:
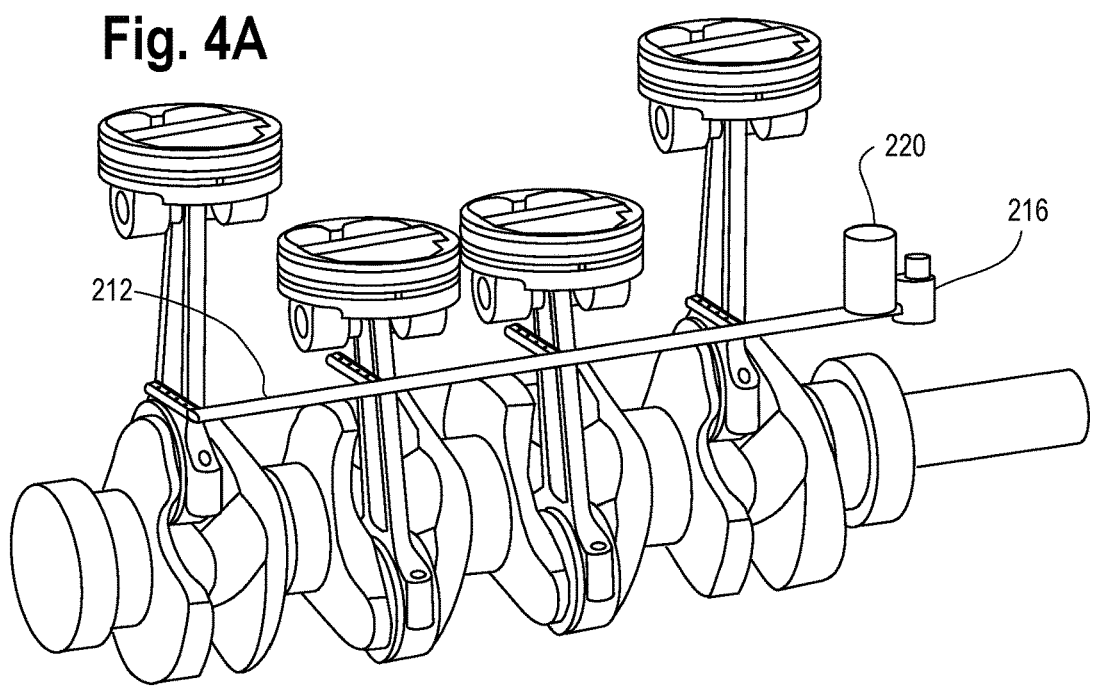
FIGS. 4A and 4B are various views of an embodiment of an oil spray system showing a planar jet manifold system similar to that illustrated in FIGS. 3A-3D, and further incorporates an accumulator in the system.
Figure 4B:
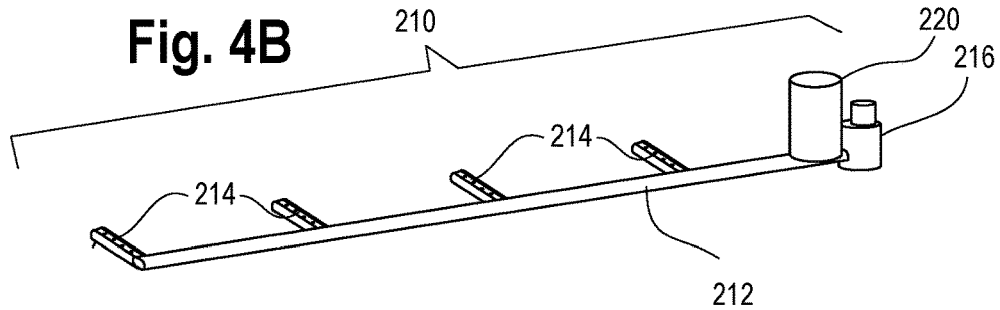

FIGS. 4A and 4B illustrate an embodiment of the system 210 similar to that of FIGS. 3A-3D, that includes an oil or hydraulic accumulator 220 for the manifold 212/solenoid 216 (or other control scheme) assembly. The accumulator 220 allows for oil flow and piston cooling on-demand regardless of the oil output of the oil pump or oil flow within the engine, engine speed or the like. In addition, the accumulator 220 dampens or smooths the supply of oil and delivery of oil to the piston and dampens pulsations in the manifold 212. Use of an accumulator 220 can also reduce the burden on the oil pump, which may allow for the use of a smaller engine oil pump.

Figure 5A:
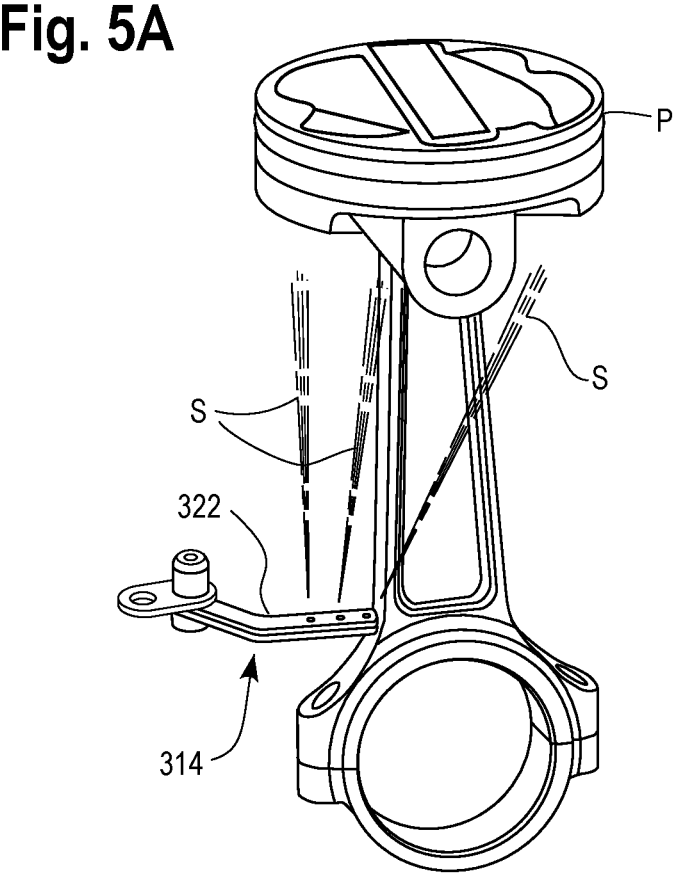
FIGS. 5A and 5B illustrate an embodiment of an offset planar jet having directed spray paths.
Figure 5B:
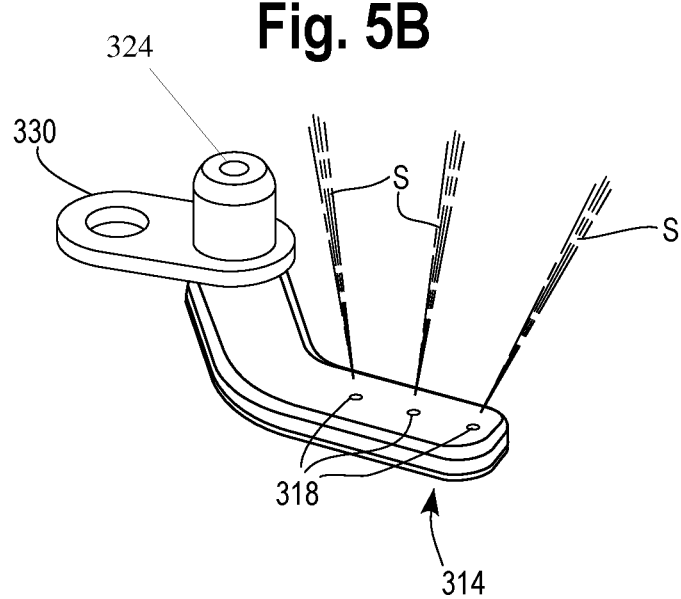

FIG. 5A illustrates a planer nozzle 314 that can be used individually as mounted to the engine, and fed individually, rather than through a manifold. The planar jet includes a body 322, an inlet side 324 and multiple outlets 318. In an embodiment, the nozzles 314 include three outlets 318, but more or less outlets are contemplated to provide for spray in desired locations. The outlets 318 can be configured so that they can be directed to specific desired areas of the piston, such as the areas of the piston at or near the cylinder exhaust port/valve and intake port/valve (see, for example, FIG. 3C which shows one desired angle/direction of the oil spray). The body 322 of the nozzle 314 can be straight or offset to provide the desired spray locations/pattern. The nozzles 314 can be secured to the engine by brackets 330.

Figure 6:
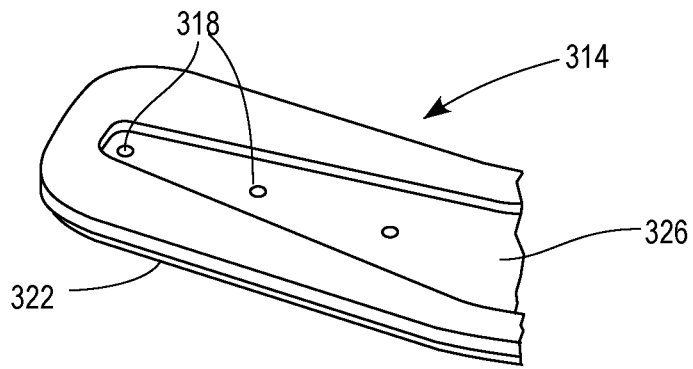
FIG. 6 is a sectional view of an embodiment of a planar jet showing a tapered jet cavity.
Figure 7A:
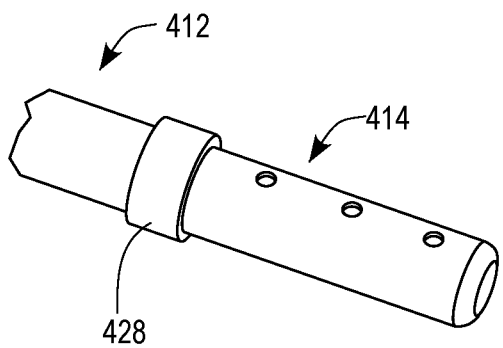
FIGS. 7A, 7B, and 7C are illustrations (FIG. 7B being a sectional view of the nozzle of FIG. 7A) a rail/manifold jet showing, in FIG. 7B, an example of a tapered or stepped nozzle cavity, and FIG. 7C showing yet another embodiment of the tapered nozzle.
Figure 7B:
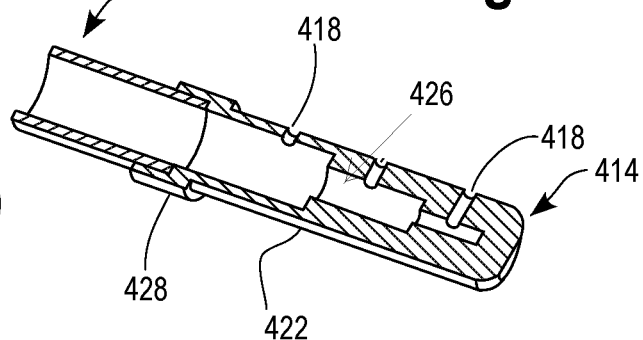

Referring to FIG. 6, a sectional view an embodiment of the nozzle 314 shows a tapered cavity 326 formed in the jet body 322 in which the oil flows to the outlets 318. Such a tapered cavity 326 can be used to balance the oil flow to selected locations of the piston. An alternate embodiment of a nozzle 414 is illustrated in FIGS. 7A and 7B, in which the nozzle 414 has a cylindrical body 422 (in contrast to the flat nozzle 314 shape). Such a cylindrical body 422 shape can provide the same directed oil spray. As illustrated, the cylindrical nozzle 414 can have a tapered or stepped cavity 426 to balance the oil flow to selected locations of the piston. It will be appreciated that the cavity 426 taper can be a smooth taper from the inlet of the nozzle 414 to the end of the nozzle 414. The nozzle 414 can include a weld sleeve or collar 428 so that the nozzle 414 can be welded or otherwise secured to the oil supply line/manifold 412.

Figure 7C:
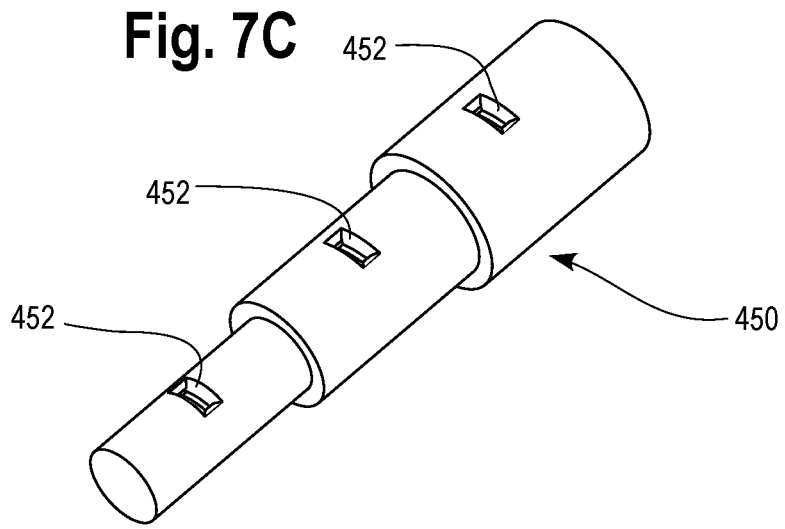
Figure 8A:
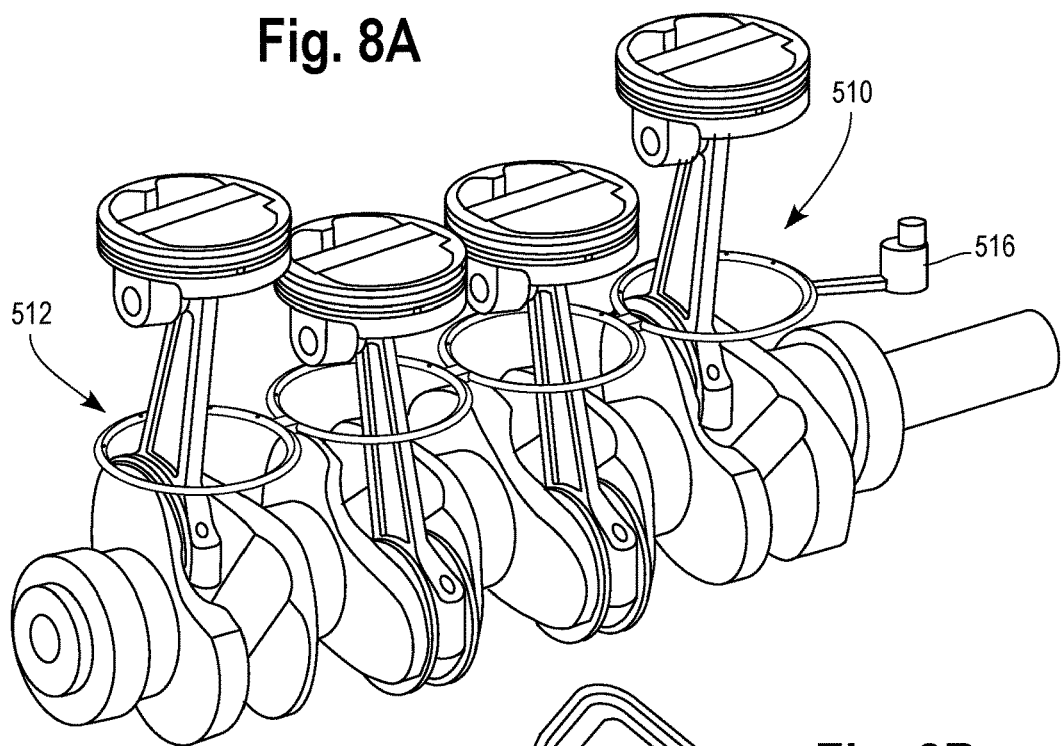
FIGS. 8A-8D are illustrations of an embodiment of the oil spray system showing a radial jet manifold.
Figure 8B:
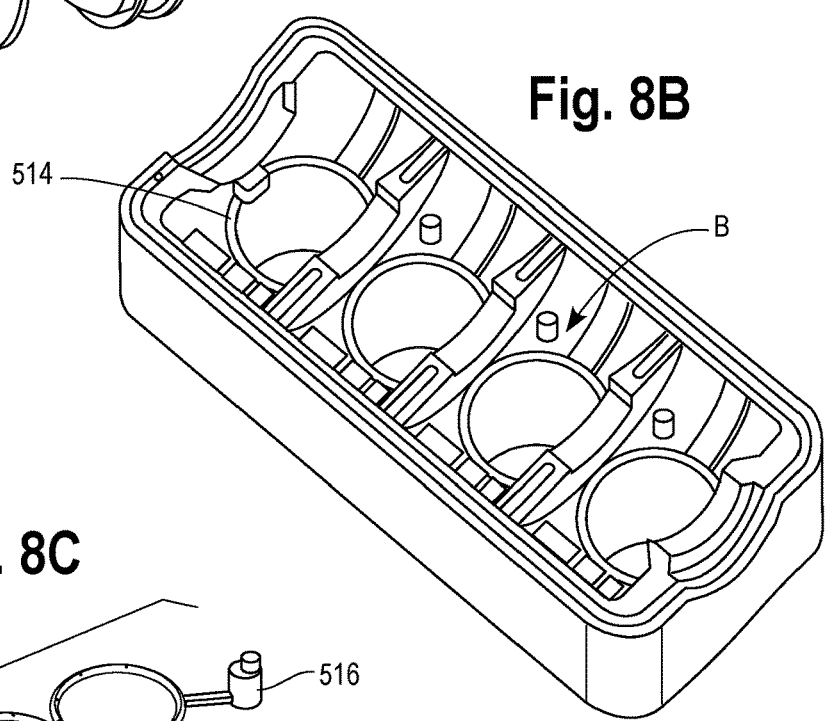
Figure 8C:
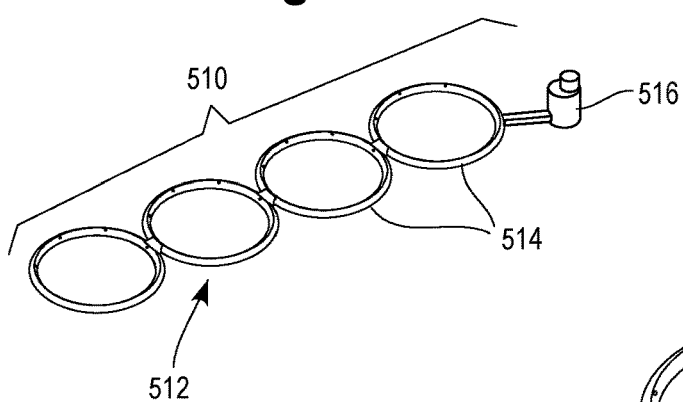
Figure 8D:
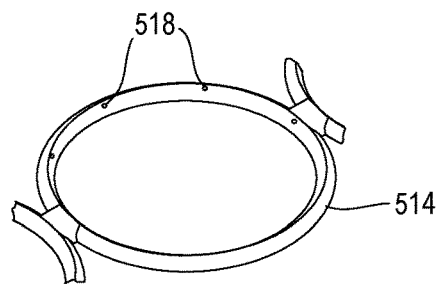

FIG. 7C illustrates yet another embodiment of the nozzle 450 in which the outlets 452 include an elongated slot-like shape to provide a fan spray pattern. The nozzle 450 can include a single outlet 452, or, as shown, multiple (three shown) outlets 452. Here too, the nozzle 450 can be tapered to balance the oil flow to selected locations of the piston. Other shapes of both the single and multiple outlet 452 configurations are contemplated to provide one or more directed oil sprays. It will be appreciated that a nozzle can include outlets having different shapes to effect different spray patterns or directions.

It will also be appreciated that the jet or nozzle 414 diameter and number of nozzles 414 can be optimized to the targeted location for each outlet 418. For example, outlets 418 directed to the hotter exhaust side of the piston can be larger or the nozzles 414 can have additional openings or outlets. In addition the internal features, (the tapered or stepped cavity 426, flow restrictors or the like), facilitate manufacturing/tooling as well as provide the desired the flow characteristics for the nozzle 414 and outlets 418.

Figure 9A:
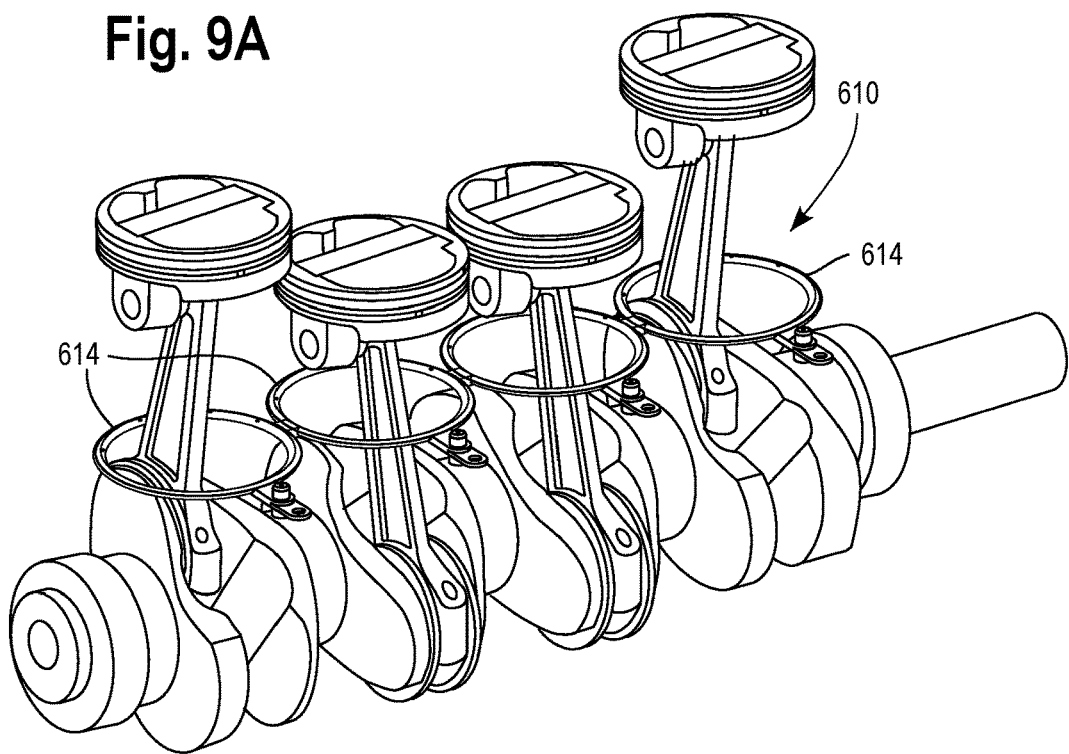
FIGS. 9A-9C are illustrations of an embodiment of the oil spray system showing a radial jet system with individual radial jets.
Figure 9B:
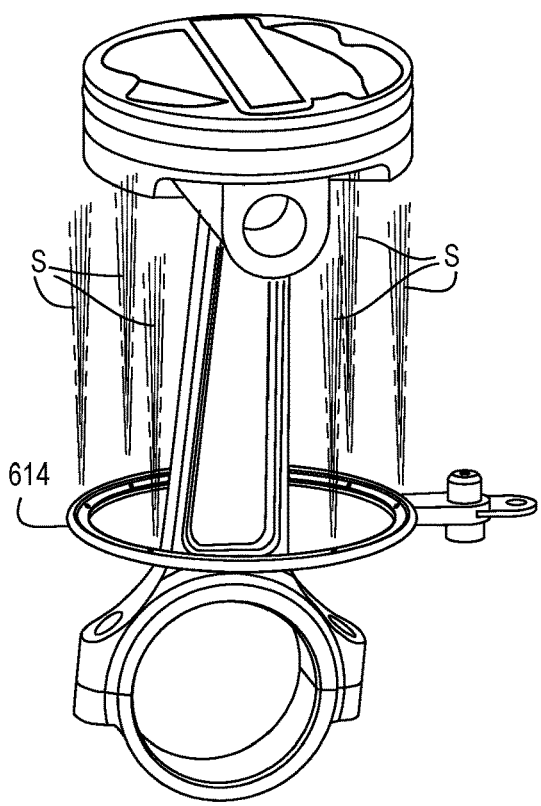
Figure 9C:
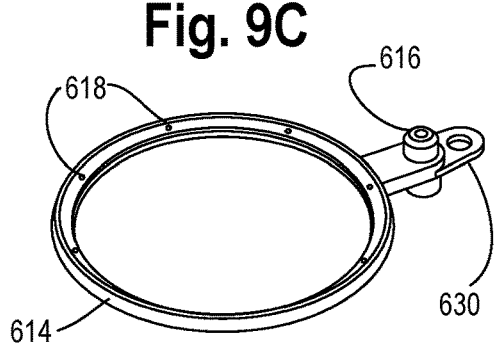

FIGS. 8A-8D illustrate a radial jet manifold system 510. The radial manifold system 510 includes a series of radial jets 514 connected to one another to form a manifold 512 such that oil flows from, for example, a solenoid 516 or other control device (e.g., check valve, thermostatic valve or the like), to each of the radial jets 514. Each jet 514 can be configured with a series of outlets 518 to spray oil at specific targeted locations on the piston P. In one configuration, the radial jets 514 are located at the base B of the cylinder in the engine block (see, FIGS. 8A and 8B). The radial jet manifold system 510 shares the benefits of the previously discussed embodiments of FIGS. 2-7, but is positioned concentrically below the cylinder bore. The diameter and orientation of the outlets 518 can optimized based on the area of the piston P that is being targeted. FIGS. 9A and 9B illustrate a similar radial jet system 610, with the jets 614 formed as individual jets, rather than connected to a manifold in series. Each jet 614 is mounted to the engine block, for example at the base of the cylinder bore (as in FIG. 8B). The jets 614 can be mounted by a bracket 630 and can include a valve 616 for control, such as a check valve, a thermostatic valve or the like. The oil spray paths S for the jets 618 for the embodiments of FIGS. 8 and 9 can be as shown in FIG. 9B. The individual jets 614 can be controlled separately by a solenoid 616, check valve, thermostatic valve or a like control device. The geometry of the individual radial jets 614 can be a full, e.g., continuous, or partial circle as required or dictated by engine design considerations.

Figure 10A:
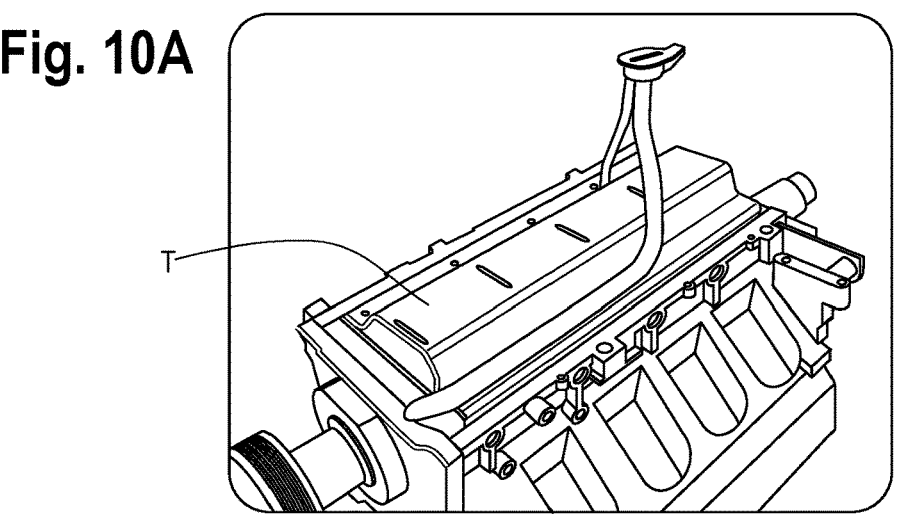
Figure 10B:
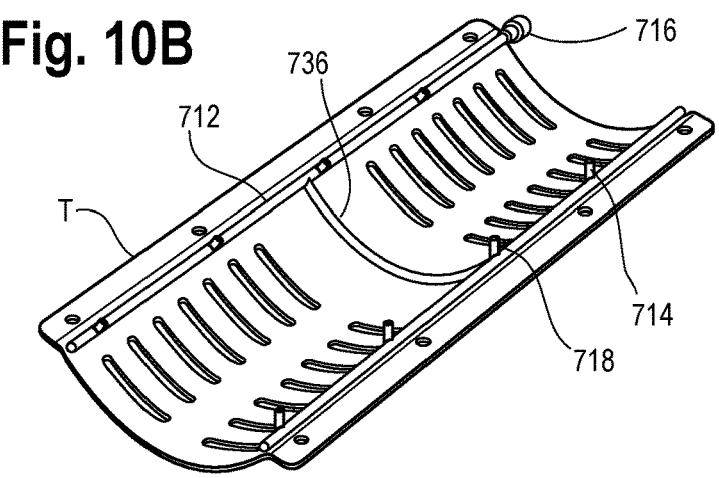
Figure 10C:
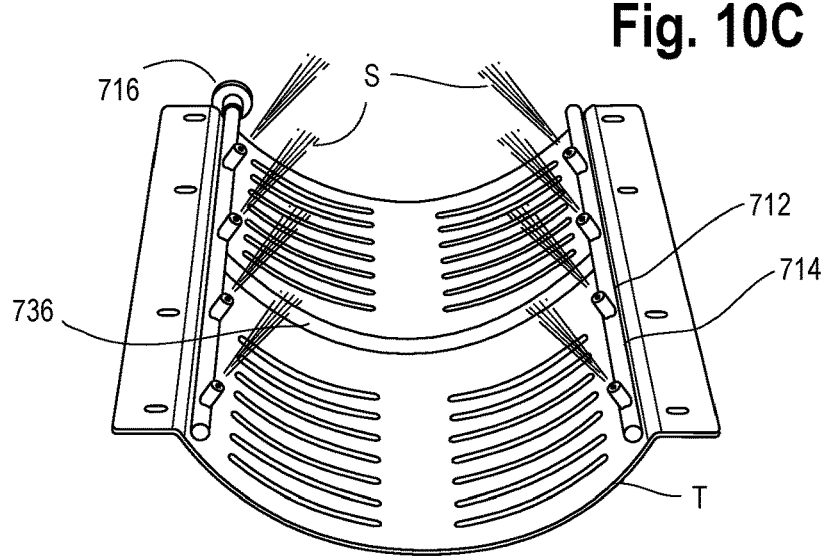

Referring to FIGS. 10A-10C, embodiments of the oil spray or piston cooling jet system 10-410, can be incorporated into existing engine components. For example, as shown in FIG. 10A, the system 10-410 can be incorporated into the windage tray T of the engine. It will be appreciated that FIG. 10A is a bottom view of the engine. Manifolds or supply lines, such as that illustrated at 712 for the systems can be incorporated onto the top side (not shown) of the tray T. FIGS. 10B and 10C illustrate such an arrangement in which the manifold or manifolds 712 can be incorporated into the tray T. Manifolds or supply lines can be molded directly into a one-piece windage tray, without the need for separate, attached components.

In FIGS. 10B and 10C, the manifolds 712 are mounted on either side of the tray T and a single oil supply port 716 feeds the manifolds 712. A manifold or cross-over supply line 736 can be used to fluidly connect the two manifolds 712 (or the two portions of the system). The jets 714 can be positioned extending from the manifolds 712 with nozzles and outlets as described herein.

It will be understood that many of the features described in connection with one or the embodiments can be used with others of the embodiments also described. It will also be appreciated that although a 4 cylinder engine is shown in many of the figures, the present oil spray or piston cooling jet systems 10-710 can be used with engines having a variety of numbers of cylinders and with engines of different types for which discrete area cooling and/or lubrication may be desired and that all such configurations and uses are within the scope and spirit of the present disclosure.

In the present disclosure, the words "a" or "an" are to be taken to include both the singular and the plural. Conversely, any reference to plural items shall, where appropriate, include the singular. It will also be appreciated by those skilled in the art that the relative directional terms such as upper, lower, rearward, forward and the like are for explanatory purposes only and are not intended to limit the scope of the disclosure.

All patents or patent applications referred to herein, are hereby incorporated herein by reference, whether or not specifically done so within the text of this disclosure.

From the foregoing it will be observed that numerous modification and variations can be effectuated without departing from the true spirit and scope of the novel concepts of the present disclosure. It is to be understood that no limitation with respect to the specific embodiments illustrated is intended or should be inferred. The disclosure is intended to cover by the appended claims all such modifications as fall within the scope of the claims.

The invention claimed is:

1. An oil spray system for use in an engine, for spraying a stream of oil directly onto a piston or cylinder wall, comprising:

a supply line; and a plurality of nozzles mounted to the supply line along a length thereof, wherein each nozzle has a plurality of outlets, wherein at least one of the plurality of nozzles is configured to provide at least one predetermined spray direction or pattern, and wherein each nozzle includes a tapered channel that includes a reduction in flow area between the plurality of outlets.

2. The oil spray system of claim 1, including a control device mounted to the supply line.

3. The oil spray system of claim 1, wherein the supply line is a manifold having the plurality of nozzles mounted thereto.

4. The oil spray system of claim 3, wherein the plurality of nozzles are configured to provide converging and/or diverging spray patterns.

5. The oil spray system of claim 1, wherein each nozzle includes at least three outlets.

6. The oil spray system of claim 5, wherein the at least three outlets are configured to provide converging and/or diverging spray patterns.

7. The oil spray system of claim 2, wherein the control device is positioned between an oil supply and the first of the plurality of nozzles.

8. The oil spray system of claim 1, wherein each nozzle is an element separate from the supply line and is attached thereto.

9. The oil spray system of claim 1, wherein a connecting portion between the supply line and each nozzle extends outwardly from the supply line.

10. The oil spray system of claim 9, wherein the plurality of outlets are formed in each nozzle at different distances from a juncture of the nozzle and the supply line.

11. The oil spray system of claim 2, wherein the control device is a solenoid valve, a thermostatic valve or a check valve.

12. An oil spray system for use in an engine, for spraying a stream of oil directly onto a piston or cylinder wall, comprising:

a supply line, wherein the supply line is a manifold;

a control device disposed at an end of the manifold; and a plurality of nozzles mounted to the supply line along a length thereof, wherein each nozzle has a plurality of outlets disposed in a linear pattern, wherein each nozzle includes a tapered channel, tapering to a reduced flow area from an inlet of the nozzle to an end of the nozzle so that the channel tapers from a first outlet to a second outlet of the plurality of outlets, wherein at least one of the plurality of nozzles is configured to provide at least one predetermined spray direction or pattern, and wherein the plurality of nozzles are configured to provide at least one of converging or diverging spray patterns.

13. The oil spray system of claim 12, wherein each nozzle is formed as a continuous flow channel.

14. The oil spray system of claim 13, wherein each nozzle is circular.

15. The oil spray system of claim 1, including an accumulator.

16. The oil spray system of claim 15, wherein the accumulator is positioned on the supply line, between a control device and a first nozzle.

17. The oil spray system of claim 1, wherein the channel tapers from an inlet of the nozzle to an end of the nozzle.

18. The oil spray system of claim 12, including a control device mounted to the supply line, the control device controlling a supply of oil to the supply line.

* * * * *